UNITED STATES PATENT OFFICE 2,623,065

METHODS FOR PRODUCING ALKOXYNAPH-THOYLALKANOIC ACIDS

Robert R. Burtner, Skokie, Ill., assignor to G. D. Searle & Co., Chicago, Ill., a corporation of Illinois No Drawing. Application October 12, 1950, Serial No. 189,891

8 Claims. (Cl. 260—520)

This invention relates to methods for producing alkoxynaphthoylalkanoic acids. More particularly this invention relates to processes of producing α-alkoxynaphthoylalkanoic acids by the Friedel-Crafts method, using as the reaction medium anhydrous benzene and conducting the reactions at elevated temperatures.

In the past such reactions have been conducted at low temperatures, that is, at 0° to 20° C. in tetrachloroethane and related halogenated aliphatic hydrocarbons, or in carbon disulfide. Unless highly purified halogenated solvents, which are not commercially available, are used these procedures give low yields of acids which are contaminated with undesirable side-products, resulting from interaction of the alkoxynapthalenes and active halogen compounds found in the commercial tetrachloroethane. With carbon disulfide the acids contain sulfur-containing impurities. Consequently the methods of the prior art, in commercial practice, require complicated purification procedures and hence give low yields of materials of sufficient purity for medicinal purposes.

I have discovered that the use of benzene as the solvent and conduction of the reaction at elevated temperatures results in greatly increased yields of purer products. This result is quite unexpected because, as is well known, benzene itself undergoes Friedel-Crafts type reactions. Furthermore it has been reported that such reactions are preferably carried out at low temperatures, particularly since elevated temperatures induce dealkylation of the product.

My discovery has resulted in feasible methods for synthesizing in high purity compounds of the general type

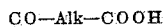
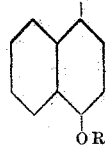

for use in the medical arts, wherein R represents a lower alkyl radical and Alk represents a lower alkylene radical.

The substances produced by my methods are useful as medicinal agents, particularly as choleretic drugs. They are also useful as intermediates in the synthesis of medicinal agents, dyestuffs, pesticides, and the like. It is the object of this invention to produce acids of the foregoing type in high yield and in a state of purity by the use of cheap and readily available reactants and solvents. It is a further object of this invention to prepare such acids without the use of halogenated aliphatic hydrocarbons and by avoiding the undesirable side reactions which result from such materials. Other objects will be apparent to those skilled in the art.

According to my discovery, anhydrides of dibasic aliphatic acids of structural formula $$\text{HOOC—Alk—COOH}$$

where Alk represents an alkylene radical containing from two to five carbon atoms, are condensed with an α-alkoxy naphthalene of the formula

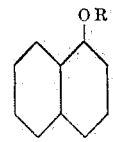

where R represents a lower alkyl radical, in the presence of a Friedel-Crafts type catalyst in anhydrous benzene. Similarly the hemi-acid halide hemi-lower alkyl ester of the formula

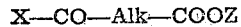

may be used, wherein X is halogen and Z is lower alkyl. In such cases the resulting ester is saponified to produce the desired acid. The preferred Friedel-Crafts type catalyst for this reaction is anhydrous aluminum chloride. Other related catalysts are those including anhydrous aluminum bromide, anhydrous sodium-aluminum chloride, boron trifluoride, anhydrous ferric chloride, anhydrous stannic chloride, hydrogen fluoride, sulfuric acid, and the like.

In practice I have found that equivalent amounts of the dibasic acid anhydrides and of the alkoxynaphthalenes may be used with two or slightly more than two equivalents of the Friedel-Crafts type catalyst. Excesses of the alkoxy-naphthalenes are acceptable although undesirable from the cost viewpoint. Likewise, considerably more than two moles of the Friedel-Crafts type catalyst may be used although this is generally economically undesirable. When the hemi-acid halide hemi-alkyl ester of the dibasic acid is used, only one or slightly more than one equivalent of catalyst is required.

The reactions are conducted at elevated temperatures at the range of 60–100° C. for a brief period of time, that is, from one-half to three hours. After the reaction has been completed at elevated temperatures, the products are isolated by decomposing the reaction mixture with dilute acid or preferably with ice and acid. The solvent is then removed, preferably by steam distillation, and the desired products are insoluble in the resulting aqueous medium. They are removed by filtration or by extraction with an organic solvent and are obtained in a state of good purity without further purification. However, in order to eliminate non-acidic contaminants and inorganic impurities, it is generally desirable to dissolve the reaction product in dilute aqueous alkali at elevated temperatures and treat the resulting solution with activated charcoal followed by chilling and acidification. The precipitate of the organic acid that results can then be separated by filtration and drying.

My invention is disclosed in further detail by the following examples but is not to be construed as limited thereto in spirit and in scope. Relative quantities of materials are given in parts by weight, and temperatures are recorded in degrees centigrade.

*Example 1*

395 parts of α-methoxynaphthalene and 265 parts of succinic anhydride are dissolved in 8,000 parts of dry benzene at room temperature. The resulting solution is stirred and 710 parts of anhydrous aluminum chloride are added over a period of twenty minutes. During the addition the temperature of the reaction mixture rises to about 60–70° C. After the addition the reaction mixture is stirred for fifteen or twenty minutes at 60–70° C. and then refluxed for one hour. The hot reaction mixture is then poured onto a mixture of 5,000 parts of ice and 900 parts of concentrated hydrochloric acid. The benzene is removed by steam distillation and the hot aqueous residue is filtered to remove the insoluble β-(1-methoxy-4-naphthoyl) propionic acid. The residue of the latter is dried and then dissolved in 16,000 parts of hot water containing 300 parts of sodium carbonate. The hot solution is treated with activated charcoal, filtered while hot, chilled and acidified. The residue of purified acid is collected on a filter, washed with water, and dried at 65° C. A yield of 552 parts of purified β-(1-methoxy-4-naphthoyl) propionic acid, melting at 172–173° C. is obtained.

*Example 2*

An experiment, conducted according to the procedure of Example 1, using four times the amount of reagents but only twice the amount of benzene, gave a yield of 2,440 parts of purified β-(1-methoxy-4-naphthoyl) propionic acid, melting at 172–173° C.

*Example 3*

An experiment, conducted as in Example 1, but using eight times the amounts of reagents and solvents gave a yield of 4,470 parts of β-(1-methoxy-4-naphthoyl)propionic acid, melting at 172° C.

*Example 4*

To a solution of 648 parts of α-methoxynaphthalene and 470 parts of glutaric anhydride in 5,000 parts of benzene at room temperature are added 1,090 parts of anhydrous aluminum chloride with good agitation over a period of about forty minutes. The temperature of the mixture rises to about 70° C. during the addition. The mixture is refluxed for one hour after the addition and then poured onto an excess of ice and hydrochloric acid. The solvent is removed by steam distillation and the residue is chilled and filtered to remove the precipitate of γ-(1-methoxy-4-naphthoyl) butyric acid. The latter is taken up in 10,000 parts of water at 85° C. containing 500 parts of sodium carbonate. The solution is cooled to room temperature, extracted with ether to remove any unreacted α-methoxynaphthalene, warmed to 85° C., treated with decolorizing charcoal, chilled, and acidified. A precipitate of 438 parts of purified γ-(1-methoxy-4-naphthoyl)butyric acid is obtained, which melts at 164–166° C. Recrystallization from methanol with the aid of activated charcoal gives material melting at 167° C.

*Example 5*

By the method of Example 4 using 100 parts of α-methoxynaphthalene, 90 parts of adipic anhydride, and 168 parts of anhydrous aluminum chloride in 800 parts of anhydrous benzene, there is obtained a yield of 60 parts of δ-(1-methoxy-4-naphthoyl)valeric acid melting at 112–113° C. This material after recrystallization from benzene, melts at 114° C.

*Example 6*

To an agitated suspension of 71 parts of anhydrous aluminum chloride in 400 parts of dry benzene at room temperature is added in 45 minutes a solution of 79 parts of α-methoxynaphthalene and 75 parts of β-carbomethoxypropionyl chloride in 100 parts of dry benzene. The temperature rises to about 65–70° C. The mixture is then stirred for about 6 hours without additional heat. It is decomposed by addition to 1000 parts of ice and 90 parts of concentrated hydrochloric acid. The benzene layer is separated, washed with water, dried and evaporated. The residue is saponified by treatment with a boiling solution of 40 parts of sodium hydroxide in 330 parts of methanol for 30 minutes. The methanol is stripped off under vacuum and the residue is taken up in 2000 parts of water. The resulting solution is made acid with concentrated hydrochloric acid, warmed to about 90° C. and filtered while hot. The precipitate of β-(1-methoxy-4-naphthoyl)propionic acid is washed with hot water and dried. There is thus obtained a yield of 110 parts of product melting at 171–173° C.

I claim:

1. The method of producing an alkoxynaphthoylalkanoic acid of the formula

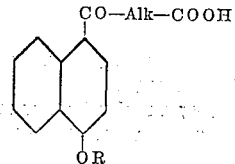

wherein Alk is an alkylene radical of two to five carbon atoms and R is a lower alkyl radical, which comprises reacting an α-(lower alkoxy)-naphthalene with an anhydride of a dibasic saturated aliphatic acid of four to seven carbon atoms in the presence of a Friedel-Crafts catalyst in benzene at elevated temperature in the range of 60–100° C. and separating the alkoxynaphthoylalkanoic acid.

2. The method of producing an alkoxynaphthoylalkanoic acid of the formula

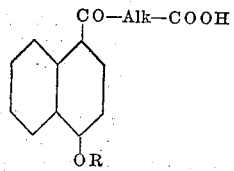

wherein Alk is an alkylene radical of two to five carbon atoms and R is a lower alkyl radical, which comprises reacting an α-(lower alkoxy)-naphthalene with an anhydride of a dibasic saturated aliphatic acid of four to seven carbon atoms in the presence of anhydrous aluminum chloride in benzene at elevated temperature in the range of 60–100° C. and separating the alkoxynaphthoylalkanoic acid.

3. The method of producing a methoxynaphthoylalkanoic acid of the formula

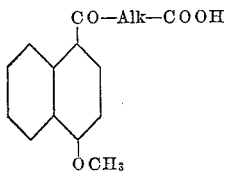

wherein Alk is an alkylene radical of two to five carbon atoms which comprises reacting an α-methoxynaphthalene with an anhydride of a dibasic saturated aliphatic acid of four to seven carbon atoms in the presence of anhydrous aluminum chloride in benzene at elevated temperature in the range of 60–100° C. and separating the methoxynaphthoylalkanoic acid.

4. The method of producing β-(1-methoxy-4-naphthoyl)propionic acid which comprises reacting α-methoxynaphthalene with succinic anhydride in the presence of anhydrous aluminum chloride in benzene at elevated temperature in the range of 60–100° C. and separating the β-(1-methoxy-4-naphthoyl)propionic acid.

5. The method of producing γ-(1-methoxy-4-naphthaoyl)butyric acid which comprises reacting α-methoxynaphthalene with glutaric anhydride in the presence of anhydrous aluminum chloride in benzene at elevated temperature in the range of 60–100° C. and separating the γ-(1-methoxy-4-naphthoyl)butyric acid.

6. The method of producing δ-(1-methoxy-4-naphthoyl)valeric acid which comprises reacting α-methoxynaphthalene with adipic anhydride in the presence of anhydrous aluminum chloride in benzene at elevated temperature in the range of 60–100° C. and separating the δ-(1-methoxy-4-naphthoyl)valeric acid.

7. The method of producing an alkoxynaphthoylalkonic acid which comprises reacting an α-(lower alkoxy)-naphthalene with a member of the group consisting of an acid anhydride of an acid of the formula HOOC—Alk—COOH wherein Alk is an alkylene radical of two to five carbon atoms, and an acid halide of the formula X—CO—Alk—COOZ wherein X is halogen and Z is lower alkyl, in the presence of a Friedel-Crafts catalyst in benzene at elevated temperature in the range of 60–100° C. and separating the alkoxynaphthoylalkanoic acid.

8. The method of producing β-(1-methoxy-4-naphthoyl)propionic acid which comprises reacting α-methoxynaphthalene with β-carbomethoxypropionyl chloride in the presence of anhydrous aluminum chloride in benzene at elevated temperature in the range of 60–100° C., saponifying the resulting ester and separating the β-(1-methoxy-4-naphthoyl)propionic acid.

ROBERT R. BURTNER.

REFERENCES CITED

The following references are of record in the file of this patent:

Desai et al., Chem. Abstracts, vol. 31, col. 3038 (1937).
Beyer, Chem. Abstracts, vol. 32, col. 4556–4557 (1938).
Burtner et al., abstract of S. N. 780,572, Official Gazette, vol. 634, p. 312 (1950).